(12) United States Patent
Ponder et al.

(10) Patent No.: US 7,332,102 B2
(45) Date of Patent: Feb. 19, 2008

(54) REFRIGERANT WITH LUBRICATING OIL

(75) Inventors: Kenneth M Ponder, Cumming, GA (US); Steffan Thomas, Jr., Buckhead, GA (US)

(73) Assignee: Stefko Properties, LLC, Alpharetta, GA (US)

( * ) Notice: Subject to any disclaimer, the term of this patent is extended or adjusted under 35 U.S.C. 154(b) by 81 days.

(21) Appl. No.: 11/176,004

(22) Filed: Jul. 6, 2005

(65) Prior Publication Data

US 2006/0033073 A1    Feb. 16, 2006

Related U.S. Application Data

(63) Continuation-in-part of application No. 10/980,977, filed on Nov. 4, 2004, now abandoned.

(60) Provisional application No. 60/517,028, filed on Nov. 4, 2003, provisional application No. 60/571,977, filed on May 18, 2004, provisional application No. 60/599,673, filed on Aug. 5, 2004.

(51) Int. Cl.
*C09K 5/04* (2006.01)

(52) U.S. Cl. .......................... 252/68; 252/67

(58) Field of Classification Search .................. 252/67, 252/68
See application file for complete search history.

(56) References Cited

U.S. PATENT DOCUMENTS

| | | | |
|---|---|---|---|
| 3,092,981 A | 6/1963 | Begeman et al. | |
| 3,642,634 A | 2/1972 | Olund | |
| 3,733,850 A | 5/1973 | Olund | |
| 4,046,533 A | 9/1977 | Olund | |
| 4,963,282 A | 10/1990 | Jolley et al. | |
| 4,971,712 A | 11/1990 | Gorski et al. | |
| 4,983,312 A | 1/1991 | Tamura et al. | |
| 5,096,606 A | 3/1992 | Hagihara et al. | |
| 5,145,594 A | 9/1992 | Anton et al. | |
| 5,254,280 A | 10/1993 | Thomas et al. | |
| 5,384,057 A | 1/1995 | Wilczek | |
| 5,417,872 A | 5/1995 | Fukuda et al. | |
| 5,431,835 A | 7/1995 | Katafuchi et al. | |
| 5,454,966 A | 10/1995 | Thomas et al. | |
| 5,492,643 A | 2/1996 | Weber, III | |
| 5,512,197 A * | 4/1996 | Jones | 252/67 |
| 5,520,833 A | 5/1996 | Kaneko | |
| 5,709,090 A | 1/1998 | Endo et al. | |
| 5,942,149 A | 8/1999 | Weber, III | |
| 6,000,230 A | 12/1999 | Kanno et al. | |
| 6,565,766 B1 | 5/2003 | Weber, III | |
| 6,596,157 B2 | 7/2003 | Gupta et al. | |
| 2004/0200992 A1 | 10/2004 | Weber, III | |

FOREIGN PATENT DOCUMENTS

| | | |
|---|---|---|
| EP | 0 742 274 A1 | 11/1996 |
| EP | 1295928 | 3/2003 |
| JP | 5 093198 A | 4/1993 |
| WO | WO 03/099958 | 12/2003 |

OTHER PUBLICATIONS

ASHRAE Standard, American Society of Heating, Refrigerating and Air-Conditioning Engineers, Inc., ANSI/ASHRAE Addendum e to ANSI/ASHRAE Standard 34-2001, 2001.
ASHRAE Standard, American Society of Heating, Refrigerating and Air-Conditioning Engineers, Inc., ANSI/ASHRAE Addendum i to ANSI/ASHRAE Standard 34-2001, 2001.
ASHRAE Standard Designation and Safety Classification of Refrigerants, ANSI/ASHRAE Addendum c to ANSI/ASHRAE Standard 34-2001, American Society of Heating, Refrigerating and Air-Conditioning Engineers, Inc. (2003).
ASHRAE Standard Designation and Safety Classification of Refrigerants, ANSI/ASHRAE Addendum h to ANSI/ASHRAE Standard 34-2004, American Society of Heating, Refrigerating and Air-Conditioning Engineers, Inc. (2006).
ASHRAE Standard Designation and Safety Classification of Refrigerants, ANSI/ASHRAE Addendum d to ANSI/ASHRAE Standard 34-2001, American Society of Heating, Refrigerating and Air-Conditioning Engineers, Inc. (2003).
Designation and Safety Classification of Refrigerants, ANSI/ASHRAE Addenda a, b, c, e, f, k, n, o, p, q, r, s and u to ANSI/ASHRAE Standard 34-2004, American Society of Heating, Refrigerating and Air-Conditioning Engineers, Inc. (2006).

* cited by examiner

*Primary Examiner*—John R. Hardee
(74) *Attorney, Agent, or Firm*—Thomas, Kayden, Horstemeyer & Risley LLP; Todd Deveau (57) ABSTRACT

An apparatus and method wherein potential ozone layer-damaging dichlorodifluoromethane (Refrigerant R-12) is substituted with a mix of less environmentally damaging refrigerants Chlorodifluoroethane and Tetrafluoroethane in dichlorodifluoromethane-based air-cooling systems, in particular HVAC and refrigeration applications. While less environmentally damaging than dichlorodifluoromethane, the substitute refrigerant is less flammable than presently available refrigerants, yet still has a temperature-pressure relationship close enough to that of dichlorodifluoromethane, making the substitute refrigerant suitable for use with dichlorodifluoromethane-based air-cooling systems. In this event, it is mixed with a lubricating oil that is compatible with both the unit refrigerant and typical R-12 system design.

14 Claims, 2 Drawing Sheets

FIG. 2

REFRIGERANT WITH LUBRICATING OIL

RELATED APPLICATIONS

This application is a continuation-in-part of application Ser. No. 10/980,977 filed Nov. 4, 2004 now abandoned that claims priority to and the benefit of provisional applications, Ser. No. 60/517,028 filed Nov. 4, 2003, Ser. No. 60/571,977 filed May 18, 2004 and Ser. No. 60/599,673 filed Aug. 5, 2004.

BACKGROUND OF THE INVENTION

1. Field of the Invention

The present invention relates to the replacement of Refrigerant R-12 (dichlorodifluoromethane) with a blend refrigerant that is less damaging to the ozone layer in systems designed to use Refrigerant R-12 (dichlorodifluoromethane). More particularly, the present invention relates to an improved refrigerant composition, method and apparatus for refrigeration wherein two non-R-12 refrigerants are mixed in a defined ratio to balance the objectives of providing a temperature-pressure relationship of the mix approximating that of Refrigerant R-12 (dichlorodifluoromethane), while at the same time being less flammable than other replacement refrigerants, for HVAC, refrigeration and automotive applications. The mixture is compatible with Refrigerant R-12 (dichlorodifluoromethane) so that it can supplement and replace Refrigerant R-12 (dichlorodifluoromethane). A further particularity of the instant invention relates to an improved method and apparatus for refrigeration wherein refrigerant mixture is mixed with a lubricating oil compatible with the lubricating oil(s) placed in the equipment during manufacture or assembly.

2. General Background

R-12 refrigerant dichlorodifluoromethane (hereinafter sometimes called "Refrigerant R-12 (dichlorodifluoromethane)") was once the major, if not sole refrigerant, used in residential air-conditioners, refrigerators, freezers and automobiles. Refrigerant R-12 (dichlorodifluoromethane) is also known as Freon 12 a trademark of E. I. du Pont de Nemours & Co. Inc. for dichlorodifluoromethane. Hereinafter, "Refrigerant R-12 (dichlorodifluoromethane)" is used in this specification to denote dichlorodifluoromethane, regardless of the source.

Refrigerant R-12 (dichlorodifluoromethane) came under attack both nationally and internationally as an ozone layer-damaging chemical with a high global warming factor. Both the national and international scientific communities linked Refrigerant R-12 (dichlorodifluoromethane) with damage to the earth's protective ozone layer. Air-conditioners, refrigerator/freezers and auto units containing R-12 are believed to be a global source of ozone-damaging material and a direct cause of global warming.

In response to scientific concern and a national and global outcry over the use of Refrigerant R-12 (dichlorodifluoromethane) in air-conditioning and refrigeration, the United States Congress acted to first reduce and then ban the use of Refrigerant R-12 (dichlorodifluoromethane) in units.

Prior to banning the sale of quantities of Refrigerant R-12 (dichlorodifluoromethane), owners of equipment with Refrigerant R-12 (dichlorodifluoromethane)-based air-conditioning units were able to purchase the level of refrigerant in their equipment with only the need of a refrigerants license as required by the Clean Air Act. Millions of units containing refrigerant R-12 (dichlorodifluoromethane) were sold in the United States prior to the start of mandatory phase out set forth by Congress and the international community.

Refrigerant R-12 (dichlorodifluoromethane) recharging typically involves 30 lb. cans or cylinders used in the HVAC/R and auto industry. The cylinders are fitted with a dispensing outlet compatible with a commercially available refrigeration manifold. In order to recharge an air-conditioning system, a customer need to only fit the can or cylinder to the manifold and discharge, or "add to" the refrigerant charge directly into the air conditioning system.

Following Congress's limitations on the sale of Refrigerant R-12 (dichlorodifluoromethane) millions of equipment owners with Refrigerant R-12 (dichlorodifluoromethane)-based air-conditioning units were left with no choice other than to reclaim or seek replacement refrigerants to service these units. Intentionally mixing of refrigerants is currently illegal by standards set forth by the Clean Air Act.

In response to Congress's ban on the use of Refrigerant R-12 (dichlorodifluoromethane) in air-conditioning, service dealers retrofitted existing Refrigerant R-12 (dichlorodifluoromethane)-based air-conditioning units with new, non-R-12 refrigerants.

Other refrigerants were developed to replace the prior, now banned R-12 refrigerant, or dichlorodifluoromethane. For example, Tamura et al. (U.S. Pat. No. 4,983,312) discloses a refrigerant consisting essentially of R134a (1,1,1, 2-tetrafluoroethane) and R142b (chlorodifluoroethane). Tamura et al., however, makes no teaching or suggestion of a lubricant.

Wilczek (U.S. Pat. No. 5,384,057), Gorski (U.S. Pat. No. 4,971,712), and Anton of DuPont (U.S. Pat. No. 5,145,594) disclose other R-12 replacements in the form of a blend of certain synthetic lubricants in various R134a and R134a/R125 refrigerant systems. The DuPont patents discuss a gas known as R125 (pentafluoroethane). R125 is five fluorine atoms bonded to an ethane molecule. This is a very large molecule for a refrigerant. It is currently being produced for refrigeration only. Anton discloses the use of a lubricant comprising at least one cyanocarbon compound. Wilczek discloses a fluorosiloxane as a lubricant. Gorski discloses a polyakylene glycol as a lubricant.

Begeman, et al. (U.S. Pat. No. 3,092,981) disclose the use of a fluoro halo derivative of an aliphatic hydrocarbon as a refrigerant in combination with alkylbenzene of 1 to 50 carbons and a viscosity of 50 to 2000 SUS (Saybolt Universal Seconds) at 100° F. Olund (U.S. Pat. No. 3,642,634) discloses a lubricating oil for refrigeration equipment consisting essentially of a high viscosity alkylbenzene having a viscosity in the range of 3000 to 1,000,000 SUS at 100° F. and a refrigerant containing a halongenated alkyl working fluid and this high viscosity alkylbenzene. (U.S. Pat. No. 3,733,850 and U.S. Pat No. 4,046,533). Kaneko (U.S. Pat. No. 5,520,833) discloses the use of a lower viscosity (viscosity of 2 to 50 cst at 100° C.) alkylbenzene or alkyl-napthelene with a substitute flon compound as a refrigerant. Generally, synthetic oils, such as alkylbenzene, and mineral oils have not been used in conjunction with R134a (1,1,1, 2-tetrafluoroethane). As noted by Fukuda, et al (U.S. Pat. No. 5,417,872) R134a has unique properties due to its special chemical structure, so that it is not miscible in refrigerating machine oils used in the refrigeration systems of R-12 refrigerant, e.g. mineral oils (naphthenic oils, paraffinic oils) and synthetic oils such as alkylbenzene.

Systems that contain R-12 are still in use today. These older systems have common components: R-12, R-12 mineral oil lubricant, and water that is sequestered into the dryer.

If R134a (1,1,1,2-tetrafluroethane) were added to the system, it would damage the system as follows: (1) if no lubricant is added to the R134a (as in U.S. Pat. No. 4,953,312 to Tamura et al.), then the R-12 system would be starved for lubricant, since the R134a gas is not miscible with the mineral oil lubricant; (2) if a synthetic lubricant is added to the R134a (as in Thomas et al., U.S. Pat. No. 5,254,280), then there is a different problem—that of moisture. Older systems can have water trapped in their dryers. Synthetic lubricants such as polyglycol or polysiloxane-based lubricants are hydrophilic. They are not only miscible with R-12 and R134a; they are also partially or completely miscible with water. Thus, if they are introduced into an R-12 system, they will pull this water out of the dryer into the refrigerant flow, possibly initiating corrosion and damage to pressure switches and the TX valve and possible other system components. This is why Elf Atochem and DuPont, to name a few publish elaborate flushing procedures and high efficiency dryer change-outs to prevent damage to the cooling system.

Weber (U.S. Pat. No. 5,492,643, U.S. Pat. No. 5,942,149, and U.S. Pat. No. 6,565,766) discloses yet another R-12 replacement consisting of a blend of R-142b (chlorodifluoroethane) in the amount of about 15% to about 40%, R-134a (tetrafluoroethane) in the amount of about 60% to about 85%, and a napthenic lubricating oil (Royco 783C, 783D). Weber generally teaches away from use of synthetic lubricants for the reasons mentioned above. Weber also teaches away from use of higher amounts of R-134a (tetrafluoroethane) noting that at higher temperature ranges, the pressure of R-134a in pure form is well above that of Freon 12 so that it would pose a hazard if used in equipment designed for using Freon 12. Further, Weber's replacement has the disadvantage of being relatively flammable because of its aerosoling tendency. In the Weber patents the preferred composition contains 79% R134a (tetrafluoroethane), 19% R142b (chlorodifluoroethane) and 2% (lubricant, Royco 783C or 783D) blend that is recognized by Refleak and Refprop (accepted industry computer modeling programs for fractionation analysis) to be flammable in the worst case formulation (WCF) temperature ranges of refrigeration uses as described in ASHRAE Standard 34 and accepted in industry. Proprietary computer modeling and bench top testing from DuPont and Honeywell also show flammability problems and concerns during worst-case fractionation (WCF) preventing acceptance in refrigeration applications. Thus, the American Society of Heating, Refrigerating and Air-Conditioning Engineers, Inc. (ASHRAE) has been unwilling to grant a designation for Weber's refrigerant blend, in particular his preferred blend of 79%/19% and 2% lubricant. The focus of Weber's patents is directed to automobile applications, an industry that monitors less closely than the HVAC/R industry.

Thus, there exists a need for an R-12 refrigerant replacement having reduced flammability which meets ASHRAE's requirements for designation while at the same time providing lubrication.

SUMMARY OF THE PRESENT INVENTION

The present disclosure provides a method and apparatus that are environmentally sound alternatives to the use of Refrigerant R-12 (dichlorodifluoromethane) as a refrigerant. More particularly, the disclosure herein provides a mixture of at least two refrigerants that are miscible with each other, and compatible with Refrigerant R-12 (dichlorodifluoromethane) and its equipment while at the same time providing a good compromise between temperature-pressure profile with similar thermodynamic properties that approximates that of Refrigerant R-12 (dichlorodifluoromethane) over the operating range of ambient temperatures usually encountered by air conditioning and refrigeration units or other apparatus utilizing Refrigerant R-12 (dichlorodifluoromethane) as a refrigerant and while at the same time reducing the flammability of the mixture to levels acceptable to ASHRAE Standard 34 and UL2182 among others. In fact in August of 2003 an exemplary embodiment of the present disclosure received an ASHRAE designation of R420A rated A1 in its safety classification. The present disclosure also provides a lubricant, that is compatible with the mixture of the environmentally sound refrigerants described herein and with Refrigerant R-12 (dichlorodifluoromethane), so that mixtures of the refrigerant according to the invention and Refrigerant R-12 (dichlorodifluoromethane) may be utilized with this lubricant in the refrigeration systems without deleterious effect upon moving parts of the refrigerating apparatus that require lubrication from the refrigerant.

More particularly, the present disclosure provides a mixture of chlorodifluoroethane and tetrafluoroethane in specific proportions that provide the aforesaid compromise over the range of ambient temperature operating conditions in which Refrigerant R-12 (dichlorodifluoromethane) is a useful refrigerant. For example, the tetrafluoroethane can include either 1,1,1,2-tetafluoroethane (R-134a) or 1,1,2,2-tetrafluoroethane (R134) and the chlorodifluoroethane can include either 1-chloro-1,1-difluoroethane (R142b) or 2-chloro-1,1-difluoroethane. In an exemplary embodiment, the refrigerant according to the invention comprises a ratio of from about 5% to about 40% weight percent chlorodifluoroethane and from about 60% to about 95% tetrafluoroethane, based upon the combined weight of tetrafluoroethane and chlorodifluoroethane. In another exemplary embodiment, the refrigerant according to the invention comprises a ratio of from less than 13% to above 10% weight percent chlorodifluoroethane and to above 87% to less than 90% tetrafluoroethane, based upon the combined weight of tetrafluoroethane and chlorodifluoroethane. In a further exemplary embodiment, the refrigerant includes 12.0%-11.0% by weight chlorodifluoroethane and 88.0%-89.0% by weight tetrafluoroethane. In yet a further exemplary embodiment, the refrigerant includes the ratio of about 12 weight percent chlorodifluoroethane to about 88 weight percent tetrafluoroethane.

In addition, the refrigerant includes a lubricating oil that is soluble in the mixture of the chlorodifluoroethane and tetrafluoroethane. In an exemplary embodiment, the percentage by weight of lubricant in the refrigerant mixture is from about 0.5 to about 20 weight percent (based on the combined weight of chlorodifluoroethane and tetrafluoroethane), more preferably 1-2%, even more preferably 1.25-2%, and most preferably 1.5-1.75% (based on the combined weight of chlorodifluoroethane and tetrafluoroethane). In another exemplary embodiment about 0.5% to about 2% by weight of the refrigerant is a hydrophobic naphthenic lubricating oil that is miscible with the cholordifluoroethane and tetrafluorethane.

Suitable lubricants are hydrophobic (immiscible with water) lubricants. Preferably no more than 5% by weight of the lubricant is hydrophilic lubricant (some aliphatic hydrocarbon solvents can absorb up to 5% by weight water and still maintain lubricating integrity). More preferably, no more than 2% by weight of the lubricant is hydrophilic lubricant. Most preferably, the refrigerant blend contains no hydrophilic lubricant.

In an exemplary embodiment, the lubricant is a manmade, synthetic alkyl aromatic lubricant. Suitable synthetic lubricants include alkylated benzene lubricants. The lubricant can be either alkylbenzene alone or a mixture of alkylbenzene and mineral oil or a mixture of alkylbenzene and polyol ester (POE).

In a further exemplary embodiment, the lubricant can be a naphthenic or a paraffinic based lubricating oil that is soluble in dichlorodifluoromethane, chlorodifluoroethane, and tetrafluoroethane, or mixtures thereof. For example, the lubricant can be selected from those lubricants sold by Anderol, Inc., East Hanover, N.J., an affiliate of Royal Lubricants Company, under the trademark ROYCO® 2302. It should be understood, however, that other lubricating oils might also be used, as long as they are compatible with chlorodifluoroethane, tetrafluoroethane, and Refrigerant R-12 (dichlorodifluoromethane) and hydrophobic.

ROYCO® 2302 is a naphthenic oil lubricant having the following composition:

65-85% hydrotreated light naphthenic distillate, 10-20% solvent refined light naphthenic distillate petroleum, <0.5% butylated triphenyl phosphate, and <2% minor additive.

The ROYCO® 2302 lacks the barium dinonylnapthalene sulfonate additive of Royco 783C and 783D.

Various additives can be included in the lubricant. Examples include a corrosion inhibitor, such as for anhydrous systems, and/or a surfactant or foaming agent. Phosphated additives add corrosion resistance in the presence of acids and salts and increase wear resistance. Calcium additives help the lubricant resist rust and the effects of corrosion; calcium salts reduce the corrosive effects of hydrochloric acid that is formed in the presence of water and the chlorinated gases present in the refrigerant systems of the present invention.

The ROYCO® 2302 lubricant mentioned above contains the corrosion inhibitors mentioned above and can also contain acrylic polymer. It is believed that the function of the acrylic polymer is to increase wear resistance under severe conditions. Acrylics can help film formation, and the ability of the lubricant to coat metal and soft parts and stay in place.

While it is intended that the substitute refrigerant according to the present disclosure may be utilized to replace or as a substitute for Refrigerant R-12 (dichlorodifluoromethane) that has escaped from apparatus, the substitute refrigerant of the invention may also be utilized to completely refill apparatus that have been designed for use with Refrigerant R-12 (dichlorodifluoromethane), since the refrigerant has a temperature-pressure profile close enough to that of Refrigerant R-12 (dichlorodifluoromethane), particularly for HVAC and refrigeration (HVAC/R) applications. Thus, when the refrigerant is used as a complete replacement for Refrigerant R-12 (dichlorodifluoromethane), it is no longer necessary that the lubricant be compatible with dichlorodifluoromethane but only that it should be compatible with tetrafluoroethane and chlorodifluoroethane and the lubricants typically used in R-12 systems. In another embodiment of the present disclosure, the refrigerant can be used as the original refrigerant in the apparatus.

In further specifics, the present disclosure provides a canister, such as an aerosol can, containing a mixture of tetrafluoroethane and chlorodifluoroethane with a synthetic lubricating oil that may be fitted with an outlet manifold that is compatible with a Refrigerant R-12 (dichlorodifluoromethane) recharging manifold that is typically used to recharge an apparatus with the latter refrigerant. Refrigerant may then be allowed to flow from the container through the manifold and into the apparatus to replace Refrigerant R-12 (dichlorodifluoromethane) refrigerant that has been lost from the refrigeration system. Significantly, there is no need to flush an existing system to use the refrigerant with the lubricant of the present disclosure.

When mixing the components of the refrigerant blend of the present disclosure, one should first mix the lubricant with the chlorodifluoroethane, then mix that mixture with the tetrafluoroethane in the proportions afore mentioned. Otherwise, the product may not mix properly. When adding the refrigerant blend of this disclosure to a refrigerant system, one should leave the greatest amount of lubricant in the system if one for some reason takes out the Refrigerant R-12.

The present disclosure is designed to be utilized as a R-12 replacement in refrigeration systems. It is designed as a replacement, in which little or no modifications including parts are used to adapt the system for the refrigerant of the present disclosure.

The lubricants of the present disclosure are miscible with the chlorodifluoroethane and tetrafluoroethane refrigerant blend and with R-12 refrigerant. This allows for mixing of residual R-12 refrigerant and the refrigerant of the present disclosure, without the release of residual water in the dryer and subsequent system damage (as will happen if the synthetic lubricants disclosed in Thomas et al. and the DuPont patents are used).

The present refrigerant mixture can be used as a replacement for R-12 refrigerant, typically deminimus without retrofitting the air conditioning system or flushing it out. It is recommended that a full vacuum be obtained before adding the refrigerant.

BRIEF DESCRIPTION OF THE FIGURES

The present refrigerant will hereinafter be described and more readily understood from a reading of the following description and by reference to the accompanying drawings.

DETAILED DESCRIPTION OF THE PREFERRED EMBODIMENT

The present refrigerant is a mixture of non-Refrigerant R-12 refrigerants that are less damaging to the Earth's ozone layer with a lower global warming factor and that are recommended by the U.S. Environmental Protection Agency for use in HVAC/R and also by ASHRAE. The refrigerant mixture is compatible with Refrigerant R-12 (dichlorodifluoromethane) and can be used to replace existing Refrigerant R-12 (dichlorodifluoromethane) in existing R-12 based systems. The present refrigerant replaces Refrigerant R-12 (dichlorodifluoromethane) in Refrigerant R-12 (dichlorodifluoromethane) based air-cooling and refrigeration systems, without the need to retrofit existing Refrigerant R-12 (dichlorodifluoromethane) based systems for non-Refrigerant R-12 replacement refrigerants and without the need to flush the system.

Specifically, the present refrigerant includes a mixture of chlorodifluoroethane and tetrafluoroethane and a lubricant provided under pressure in a can or cylinder equipped with an outlet compatible with existing Refrigerant R-12 (dichlorodifluoromethane) recharging kit manifolds, so that the refrigerant and lubricant mixture can be added to existing Refrigerant R-12 (dichlorodifluoromethane) based coolant systems. Also, the present refrigerant provides the possibility of using new refrigerant systems, originally designed for "Refrigerant R-12 (dichlorodifluoromethane)," by supplying an EPA-approved refrigerant so that retrofitting to new equipment use is not required.

In an exemplary embodiment, a cylinder can like the standard 25 or 30 lb. can formerly used for containing Refrigerant R-12 (dichlorodifluoromethane) is provided, but containing from about 60% to about 95% by weight tetrafluorethane (R-134 refrigerant) and from about 5% to about 40% by weight chlorodifluoroethane (R-142 refrigerant). The can also contains a lubricant in solution with the refrigerant mixture at a percent by weight of in the range of about 0.5% up to about 20% by weight of the combined weight of the refrigerants.

In another exemplary embodiment, a cylinder can like the standard 25 or 30 lb. can formerly used for containing Refrigerant R-12 (dichlorodifluoromethane) is provided, but containing less than 90% to more than 87% by weight tetrafluorethane (R-134 refrigerant) and more than 10% to less than 13% by weight chlorodifluoroethane (R-142 refrigerant). The can also contains a lubricant in solution with the refrigerant mixture at a percent by weight of in the range of about 0.5% up to about 2% by weight of the combined weight of the refrigerants.

Such lubricants are preferably hydrophobic (immiscible with water) lubricants. Preferably no more than 5% by weight of the lubricant is hydrophilic lubricant (some aliphatic hydrocarbon solvents can absorb up to 5% by weight water and still maintain lubricating integrity). More preferably, no more than 2% by weight of the lubricant is hydrophilic lubricant. Most preferably, the refrigerant blend contains no hydrophilic lubricant.

One exemplary lubricant is the aforementioned Royco 2302 naphthenic lubricant. The lubricant can have a viscosity of 5-500 centistokes. In another embodiment the lubricant can has a viscosity of 5-10 centistokes.

Another exemplary lubricant is a synthetic alkylate hydrocarbon, such as a man-made, synthetic alkyl aromatic lubricant. One example of such a lubricant is a synthetic alkylbenzene sold under the product name Zerol 30 by Shrieve Chemical products. Zerol 30 is an extra low viscosity, high quality, synthetic alkylbenzene composition having a boiling point of greater than 240° C. at atmospheric pressure, a specific gravity at 15° C. of 0.86-0.88, a viscosity of 4-8 cSt at 40° C. (typically about 5.5 cSt), a pour point of −35° C. max (typically −40° C.), and a water content of 30 ppm in bulk. Such a synthetic alkylate hydrocarbon lubricant can also include a minor portion of either mineral oil or polyol ester (POE) mixed with the synthetic lubricant. By minor portion we mean less than 50% by weight of the total lubricant present.

The present disclosure provides lubricants that are compatible with the invention mixture of tetrafluoroethane and chlorodifluoroethane, and with "Refrigerant R-12 (dichlorodifluoromethane)," and that are suitable for lubricating refrigerant compressors and other air-conditioner component parts. While alkylbenzene alone is considered not miscible with tetrafluoroethane (in particular R134a), it is sufficiently soluble in the present tetrafluoroethane/chlorodifluoroethane mixture. This solubility allows the replacement refrigerant blend to lubricate the system, preventing damage to the compressor and component parts of the system.

EXAMPLE 1

Figure 1:
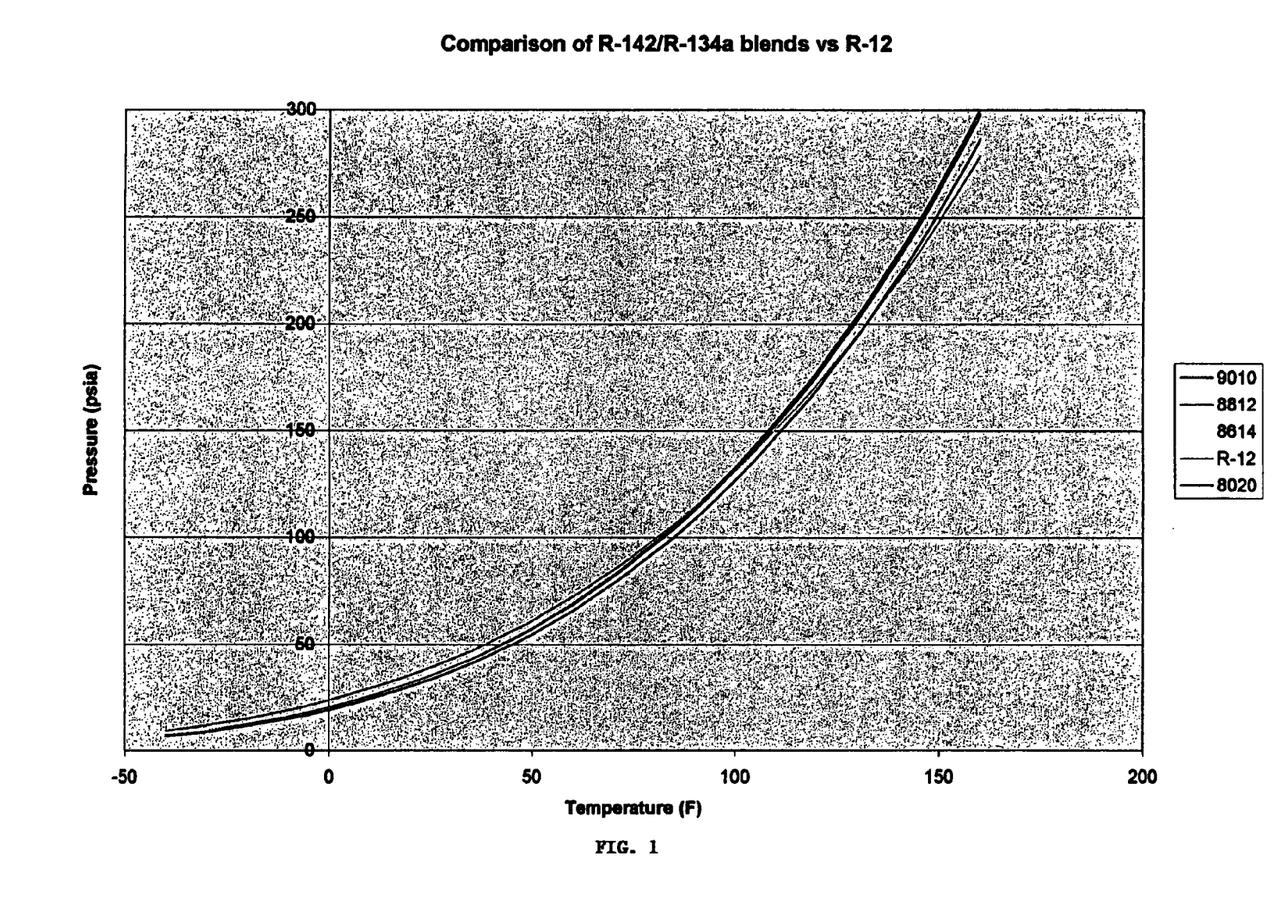
FIG. 1 is a graph comparing the temperature-pressure profiles of various R-142/R-134a blends versus the profile for R-12.

1,1,1,2-tetrafluoroethane and dichlorofluoroethane refrigerants are mixed with a suitable lubricant, such as either the Royco 2302 naphthenic lubricant or an alyklbenzene synthetic lubricant (such as L30 or L35 from Shrieve Chemical Company, The Woodlands, Texas, or Zerol 150 from Nu-Calgon Wholesale, Inc., St. Louis, Mo., or AB 150 from Virginia KMP Corporation, Dallas, Tex.) at set ratios such that the temperature-pressure profile of the mixture is compared to that of Refrigerant R-12 (dichlorodifluoromethane), over the normal operating range of air conditioning and refrigeration systems of from about −60° F. to 160° F. The set ratios range from 80% to 90% 1,1,1,2-tetrafluoroethane and 10% to 20% chlorodifluoroethane. A similar temperature-pressure profile was obtained for Refrigerant R-12 (dichlorodifluoromethane). The results were plotted and compared in FIG. 1. FIG. 1 shows that as the amount of tetrafluoroethane increases in the blends, the temperature-pressure profile of the blends has a greater divergence from the temperature-pressure profile of R-12 at the higher temperatures.

Figure 2:
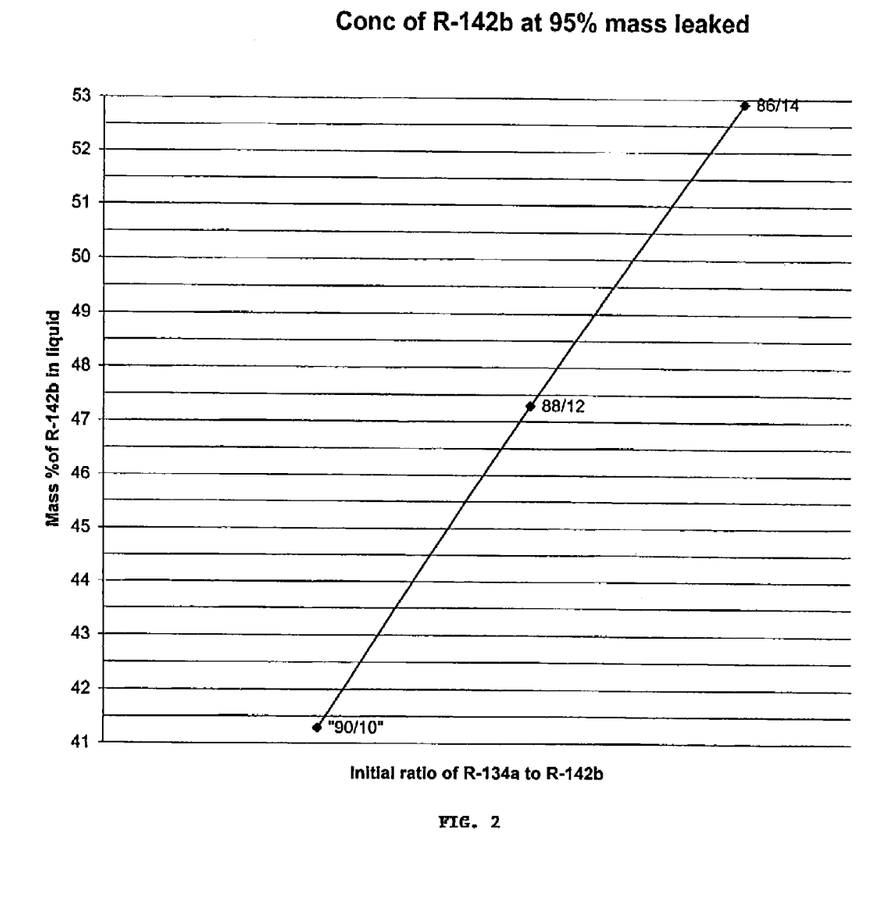
FIG. 2 is a graph of a fractionation analysis on various R-142/R-134a blends.

A fractionation analysis was conducted for three of the blends found in FIG. 1, namely blends having ratios of 86/14, 88/12 and 90/10 by weight percent of tetrafluoroethane to chlorodifluroethane. The results of this fractionation analysis are illustrated in FIG. 2. The purpose of this test is to determine the effect on the refrigerant mixture should a leak occur in the refrigeration or air conditioning system. The lubricant used has no effect on this analysis. Since tetrafluoroethane evaporates at lower temperatures than chlorodifluroethane, when a leak occurs more tetrafluoroethane evaporates than chlorodifluoroethane. Thus, for example, for an 86/14 blend of tetrafluoroethane to chlorodifluoroethane when 95% of the initial mass of blend has leaked, the remaining liquid refrigerant comprises 52.91% R142b (chlorodifluroethane). A liquid refrigerant having that much R142b (chlorodifluroethane) is considered flammable. In general, the refrigerant mixture needs to have less than about 48% R142b in the liquid to be considered to have a reduced level of flammability acceptable to ASHRAE Standard 34 and to receive an ASHRAE designation rated A1 in its safety classification.

The most preferred ratio is about 12% by weight chlorodifluoroethane to about 88% by weight 1,1,1,2-tetrafluoroethane. This is the ratio of chlorodifluoroethane to 1,1,1,2-tetrafluoroethane with the lubricant where the mixture of the invention shows the best compromise between greatest similarity to "Refrigerant R-12 (dichlorodifluoromethane)" over most operating temperatures with no flame propagation. At this ratio, the fractionation study of FIG. 2 shows a residual concentration of R-142 (chlorodifluoroethane) at 95% mass leaked of 47.3%, just below the concentration of R-142 considered to be flammable.

In the most preferred embodiment of the composition, the most preferred ratios of 1,1,1,2-tetrafluoroethane and chlorodifluoroethane are mixed with a range of from 0.5% to 2% by weight of lubricant as aforementioned.

A pressure temperature comparison of 12% chlorodifluorethane to 88% tetrafluoroethane to R-12 and R-134a is provided below in Table 1.

TABLE 1

| ° F. | Choice-R420A Refrigerant | R-12 | HFC-134a |
|---|---|---|---|
| −40 | 17.8* | 11.0 | 14.8 |
| −35 | 15.0* | 8.4 | 12.5 |
| −30 | 12.1* | 5.5 | 9.8 |
| −25 | 9.0* | 2.3 | 6.9 |
| −20 | 5.8* | 0.6 | 3.7 |
| −15 | 2.2* | 2.4 | 0.0 |
| −10 | 0.7 | 4.5 | 1.9 |
| −5 | 2.7 | 6.7 | 4.1 |
| 0 | 4.9 | 9.2 | 6.5 |
| 5 | 7.3 | 11.8 | 9.1 |
| 10 | 9.9 | 14.6 | 12.0 |
| 15 | 12.8 | 17.7 | 15.0 |
| 20 | 15.8 | 21.0 | 18.4 |
| 25 | 19.2 | 24.6 | 22.1 |
| 30 | 22.8 | 28.5 | 26.1 |
| 35 | 26.6 | 32.6 | 30.4 |
| 40 | 30.8 | 37.0 | 35.0 |
| 45 | 35.4 | 41.7 | 40.0 |
| 50 | 40.2 | 46.7 | 45.3 |
| 55 | 45.5 | 52.0 | 51.0 |
| 60 | 51.0 | 57.7 | 56.4 |
| 65 | 57.0 | 63.8 | 63.7 |
| 70 | 63.4 | 70.2 | 70.7 |
| 75 | 70.2 | 77.0 | 78.5 |
| 80 | 77.4 | 84.2 | 86.4 |
| 85 | 85.1 | 91.8 | 95.3 |
| 90 | 93.3 | 99.8 | 104.2 |
| 95 | 102.0 | 108.3 | 114.1 |
| 100 | 111.1 | 117.2 | 124.3 |
| 105 | 120.8 | 126.6 | 135.4 |
| 110 | 131.1 | 136.4 | 146.8 |
| 115 | 141.9 | 146.8 | 159.2 |
| 120 | 153.2 | 157.7 | 171.9 |
| 125 | 165.2 | 169.1 | 185.7 |
| 130 | 177.7 | 181.0 | 199.8 |
| 135 | 190.9 | 193.5 | 215.0 |
| 140 | 204.7 | 206.6 | 230.5 |
| 145 | 219.2 | 220.3 | 247.3 |
| 150 | 234.3 | 234.6 | 264.4 |

(*= in.Hg vacuum)

EXAMPLE 2

A temperature glide example of a mixture of 12% chlorodifluoroethane and 88% afluoroethane refrigerants was conducted at a temperature of 80° F. The exemplary mixture had a temperature glide of 2.5° F. as compared to 4° F. for R-12. The resulting temperature glide chart is in Table 2 below.

TABLE 2

| Temp (° F.) | P Bubble (psia) | P Dew (psia) |
|---|---|---|
| −40 | 6.941 | 6.641 |
| −39 | 7.165 | 6.855 |
| −38 | 7.389 | 7.069 |
| −37 | 7.613 | 7.283 |
| −36 | 7.837 | 7.497 |
| −35 | 8.061 | 7.711 |
| −34 | 8.285 | 7.925 |
| −33 | 8.509 | 8.139 |
| −32 | 8.733 | 8.353 |
| −31 | 8.957 | 8.567 |
| −30 | 9.181 | 8.781 |
| −29 | 9.460 | 9.048 |
| −28 | 9.739 | 9.315 |
| −27 | 10.018 | 9.582 |
| −26 | 10.297 | 9.849 |
| −25 | 10.576 | 10.116 |
| −24 | 10.855 | 10.383 |
| −23 | 11.134 | 10.650 |
| −22 | 11.413 | 10.917 |
| −21 | 11.692 | 11.184 |
| −20 | 11.971 | 11.451 |
| −19 | 12.314 | 11.779 |
| −18 | 12.657 | 12.107 |
| −17 | 13.000 | 12.435 |
| −16 | 13.343 | 12.763 |
| −15 | 13.686 | 13.091 |
| −14 | 14.029 | 13.419 |
| −13 | 14.372 | 13.747 |
| −12 | 14.715 | 14.075 |
| −11 | 15.058 | 14.403 |
| −10 | 15.401 | 14.731 |
| −09 | 15.817 | 15.130 |
| −08 | 16.233 | 15.529 |
| −07 | 16.643 | 15.928 |
| −06 | 17.059 | 16.327 |
| −05 | 17.475 | 16.726 |
| −04 | 17.891 | 17.125 |
| −03 | 18.307 | 17.524 |
| −02 | 18.723 | 17.923 |
| −01 | 19.139 | 18.322 |
| 0.0 | 19.555 | 18.721 |
| 1.0 | 20.056 | 19.201 |
| 7.0 | 23.062 | 22.081 |
| 8.0 | 23.563 | 22.561 |
| 9.0 | 24.064 | 23.041 |
| 10.0 | 24.565 | 23.521 |
| 11.0 | 25.161 | 24.093 |
| 12.0 | 25.757 | 24.665 |
| 13.0 | 26.353 | 25.237 |
| 14.0 | 26.949 | 25.809 |
| 15.0 | 27.545 | 26.381 |
| 16.0 | 28.141 | 26.953 |
| 17.0 | 28.737 | 27.525 |
| 18.0 | 29.333 | 28.097 |
| 19.0 | 29.929 | 28.669 |
| 20.0 | 30.525 | 29.241 |
| 21.0 | 31.229 | 29.916 |
| 22.0 | 31.933 | 30.591 |
| 23.0 | 32.637 | 31.266 |
| 24.0 | 33.341 | 31.941 |
| 25.0 | 34.045 | 32.616 |
| 26.0 | 34.749 | 33.291 |
| 27.0 | 35.453 | 33.966 |
| 28.0 | 36.157 | 34.641 |
| 29.0 | 36.861 | 35.316 |
| 30.0 | 37.565 | 35.991 |
| 31.0 | 38.389 | 36.782 |
| 32.0 | 39.213 | 37.573 |
| 33.0 | 40.037 | 38.364 |
| 34.0 | 40.861 | 39.155 |
| 35.0 | 41.685 | 39.946 |
| 36.0 | 42.509 | 40.737 |
| 37.0 | 43.333 | 41.528 |
| 38.0 | 44.157 | 42.319 |
| 39.0 | 44.981 | 43.110 |
| 40.0 | 45.805 | 43.901 |
| 41.0 | 46.762 | 44.822 |
| 42.0 | 47.719 | 45.743 |
| 43.0 | 48.676 | 46.664 |
| 44.0 | 49.633 | 47.585 |
| 45.0 | 50.590 | 48.506 |
| 46.0 | 51.547 | 49.427 |
| 47.0 | 52.504 | 50.348 |
| 48.0 | 53.461 | 51.269 |
| 54.0 | 59.791 | 57.367 |
| 55.0 | 60.895 | 58.431 |
| 56.0 | 61.999 | 59.495 |
| 57.0 | 63.103 | 60.559 |
| 58.0 | 64.207 | 61.623 |
| 59.0 | 65.311 | 62.087 |
| 60.0 | 66.415 | 63.751 |
| 61.0 | 67.680 | 64.972 |

TABLE 2-continued

| Temp (° F.) | P Bubble (psia) | P Dew (psia) |
|---|---|---|
| 62.0 | 68.945 | 66.193 |
| 63.0 | 70.210 | 67.414 |
| 64.0 | 71.475 | 68.635 |
| 65.0 | 72.740 | 69.856 |
| 66.0 | 74.005 | 71.077 |
| 67.0 | 75.270 | 72.298 |
| 68.0 | 76.535 | 73.519 |
| 69.0 | 77.800 | 74.740 |
| 70.0 | 79.065 | 75.961 |
| 71.0 | 80.506 | 77.354 |
| 72.0 | 81.947 | 78.747 |
| 73.0 | 83.388 | 80.140 |
| 74.0 | 84.829 | 81.533 |
| 75.0 | 86.270 | 82.926 |
| 76.0 | 87.711 | 84.319 |
| 77.0 | 89.152 | 85.712 |
| 78.0 | 90.593 | 87.105 |
| 79.0 | 92.034 | 88.498 |
| 80.0 | 93.475 | 89.891 |
| 81.0 | 95.108 | 91.472 |
| 82.0 | 96.741 | 93.053 |
| 83.0 | 98.374 | 94.634 |
| 84.0 | 100.007 | 96.215 |
| 85.0 | 101.640 | 97.796 |
| 86.0 | 103.273 | 99.377 |
| 87.0 | 104.906 | 100.958 |
| 88.0 | 106.539 | 102.539 |
| 89.0 | 108.172 | 104.120 |
| 90.0 | 109.805 | 105.701 |
| 91.0 | 111.645 | 107.487 |
| 92.0 | 113.485 | 109.273 |
| 93.0 | 115.325 | 111.059 |
| 94.0 | 117.165 | 112.845 |
| 95.0 | 119.005 | 114.631 |
| 2.0 | 20.557 | 19.681 |
| 3.0 | 21.058 | 20.161 |
| 4.0 | 21.559 | 20.641 |
| 5.0 | 22.060 | 21.121 |
| 6.0 | 22.561 | 21.601 |
| 101.0 | 130.269 | 125.568 |
| 102.0 | 132.333 | 127.575 |
| 103.0 | 134.397 | 129.582 |
| 104.0 | 136.461 | 131.589 |
| 105.0 | 138.525 | 133.596 |
| 106.0 | 140.589 | 135.603 |
| 107.0 | 142.653 | 137.610 |
| 108.0 | 144.717 | 139.617 |
| 109.0 | 146.781 | 141.624 |
| 110.0 | 148.845 | 143.631 |
| 111.0 | 151.150 | 145.878 |
| 112.0 | 153.455 | 148.125 |
| 113.0 | 155.760 | 150.372 |
| 114.0 | 158.065 | 152.619 |
| 115.0 | 160.370 | 154.866 |
| 116.0 | 162.675 | 157.133 |
| 117.0 | 164.980 | 159.360 |
| 118.0 | 167.285 | 161.607 |
| 119.0 | 169.590 | 163.854 |
| 120.0 | 171.895 | 166.101 |
| 121.0 | 174.458 | 168.606 |
| 122.0 | 177.021 | 171.111 |
| 123.0 | 179.584 | 173.616 |
| 124.0 | 182.147 | 176.121 |
| 125.0 | 184.710 | 178.626 |
| 126.0 | 187.273 | 181.131 |
| 127.0 | 189.836 | 183.636 |
| 128.0 | 192.399 | 186.141 |
| 129.0 | 194.962 | 188.646 |
| 130.0 | 197.525 | 191.151 |
| 131.0 | 200.364 | 193.933 |
| 132.0 | 203.203 | 196.715 |
| 133.0 | 206.042 | 199.497 |
| 49.0 | 54.418 | 52.190 |
| 50.0 | 55.375 | 53.111 |
| 51.0 | 56.479 | 54.175 |
| 52.0 | 57.583 | 55.239 |
| 53.0 | 58.687 | 56.303 |
| 134.0 | 208.881 | 202.279 |
| 135.0 | 211.720 | 205.061 |
| 136.0 | 214.559 | 207.843 |
| 137.0 | 217.398 | 210.625 |
| 138.0 | 220.237 | 213.407 |
| 139.0 | 223.076 | 216.189 |
| 140.0 | 225.915 | 218.971 |
| 141.0 | 229.048 | 222.051 |
| 142.0 | 232.181 | 225.131 |
| 143.0 | 235.314 | 228.211 |
| 144.0 | 238.447 | 231.291 |
| 145.0 | 241.580 | 234.371 |
| 146.0 | 244.713 | 237.451 |
| 147.0 | 247.846 | 240.531 |
| 148.0 | 250.979 | 243.611 |
| 149.0 | 254.112 | 246.691 |
| 150.0 | 257.245 | 249.771 |
| 151.0 | 260.690 | 253.170 |
| 152.0 | 264.135 | 256.569 |
| 153.0 | 267.580 | 259.968 |
| 154.0 | 271.025 | 263.367 |
| 155.0 | 274.470 | 266.766 |
| 156.0 | 277.915 | 270.165 |
| 157.0 | 281.360 | 273.564 |
| 158.0 | 284.805 | 276.963 |
| 159.0 | 288.250 | 280.362 |
| 160.0 | 291.695 | 283.761 |
| 161.0 | 295.470 | 287.501 |
| 162.0 | 299.245 | 291.241 |
| 163.0 | 303.020 | 294.981 |
| 164.0 | 306.795 | 298.721 |
| 165.0 | 310.570 | 302.461 |
| 166.0 | 314.345 | 306.201 |
| 96.0 | 120.845 | 116.417 |
| 97.0 | 122.685 | 118.203 |
| 98.0 | 124.525 | 119.989 |
| 99.0 | 126.365 | 121.775 |
| 100.0 | 128.205 | 123.561 |
| 167.0 | 318.120 | 309.941 |
| 168.0 | 321.895 | 313.681 |
| 169.0 | 325.670 | 317.421 |
| 170.0 | 329.445 | 321.161 |
| 171.0 | 333.569 | 325.267 |
| 172.0 | 337.693 | 329.373 |
| 173.0 | 341.817 | 333.429 |
| 174.0 | 345.941 | 337.585 |
| 175.0 | 350.065 | 341.691 |
| 176.0 | 354.189 | 345.797 |
| 177.0 | 358.313 | 349.903 |
| 178.0 | 362.437 | 354.009 |
| 179.0 | 366.561 | 358.115 |
| 180.0 | 370.685 | 362.221 |
| 181.0 | 375.176 | 366.658 |
| 182.0 | 379.667 | 371.095 |
| 183.0 | 384.158 | 375.532 |
| 184.0 | 388.649 | 379.969 |
| 185.0 | 393.140 | 384.406 |
| 186.0 | 397.631 | 388.843 |
| 187.0 | 402.122 | 393.280 |
| 188.0 | 406.613 | 397.717 |
| 189.0 | 411.104 | 402.154 |
| 190.0 | 415.595 | 406.591 |
| 191.0 | 420.468 | 411.510 |
| 192.0 | 425.341 | 416.429 |
| 193.0 | 430.214 | 421.348 |
| 194.0 | 435.087 | 426.267 |
| 195.0 | 439.960 | 431.186 |
| 196.0 | 444.833 | 436.105 |
| 197.0 | 449.706 | 441.024 |
| 198.0 | 454.579 | 445.943 |
| 199.0 | 459.452 | 450.862 |
| 200.0 | 464.325 | 455.781 |

The apparatus and method of the preferred embodiment encompass the use of a mixture of refrigerants tetrafluoroethane and chlorodifluoroethane at preferred ranges, as discussed above, with lubricant at preferred ranges, as discussed above (0.5-20% by weight) in the operation of an HVAC/R system, wherein the coolant-oil mixture replaces Refrigerant R-12 (dichlorodifluoromethane) in a Refrigerant R-12 (dichlorodifluoromethane)-based refrigeration system.

The method and apparatus in the preferred embodiment further entails providing the above described mix of chlorodifluoroethane/1,1,1,2-tetrafluoroethane and lubricant in 25 lb cylinders, where the cylinders are pressure sealed and fitted with an outlet compatible for existing Refrigerant 12-type refrigeration manifolds typically ¼ inch male flare.

Further, it was noted that the systems tested ran more smoothly and the compressor showed less vibration during the test period, as the mixture was added. It is theorized that the lubricating oil, being soluble in the refrigerant gasses, was better able to lubricate the compressor and reciprocating parts than the existing Refrigerant R-12 (dichlorodifluoromethane) lubricant used by itself. In some applications, depending on the charge, a reduction in power consumption maybe also noted. The optimum percentage charge for this invention is at a 92% charge of the called for charge of the R-12 system being retrofitted.

Pure refrigerant 1,1,1,2-tetrafluoroethane is not miscible with naphthenic oil or mineral oil (both of which could be used as the lubricants of the present disclosure). Chlorodifluoroethane is miscible with most naphthenic oils such as alkylbenzene and also mineral oils. The presence of the chlorodifluoroethane allows the use of naphthenic oil alone or mixed with mineral oils in the refrigerant blend and system of the present invention (a translucent, partially miscible blend is formed). Alkylbenzene, when added to mineral oil, is accepted to provide improved lubricating qualities to those of mineral oil alone. The lubricant can advantageously be partially polymerized into longer chain molecules to allow it to function at very low percentage levels. The lubricant can be hydrotreated or polymerized for stability and wear resistance.

The lubricant of the present disclosure is miscible with R-12, R-22, and the blend of the refrigerant gases described herein.

Although exemplary embodiments have been shown and described, it will be clear to those of ordinary skill in the art that variations and modifications may be made of the refrigerant taught herein, and that those are within the scope and spirit of the invention as taught above and claimed here below.

What is claimed as invention is:

1. A refrigerant composition comprising a combination of refrigerant gases and non-refrigerant gas components,
   (a) the refrigerant gases consisting of:
      (a1) 12.0% to 11.0% by weight chlorodifluoroethane; and
      (a2) 89.0% to 88.0% by weight tetrafluoroethane; and
   (b) the non-refrigerant gas components including about 0.5% to about 20% by weight of the refrigerant gases of a lubricating oil,
   wherein the lubricating oil is selected from the group consisting of: synthetic alkyl aromatic lubricants, mineral oils, and polyol esters, and mixtures thereof.

2. The composition of claim 1, wherein the lubricating oil is miscible with dichlorodifluoromethane.

3. The composition of claim 1, wherein the non-refrigerant gas components further include a corrosion inhibitor for anhydrous systems.

4. In an apparatus for HVAC or refrigeration containing a refrigerant, the improvement comprising substituting the refrigerant with the composition of claim 1.

5. The invention of claim 4, wherein the refrigerant is dichlorodifluoromethane.

6. A method for refilling an apparatus for HVAC or refrigeration that is designed for use with dichlorodifluoromethane refrigerant, the method comprising:
   (1) supplying the composition of claim 1 under pressure, in a container fitted with an outlet compatible with a dichlorodifluoromethane recharging manifold of the apparatus; and
   (2) adding to said apparatus via the manifold the composition of claim 1 from said container.

7. In an apparatus for air-conditioning containing a refrigerant the improvement comprising substituting at least a portion of the refrigerant with the composition of claim 1.

8. The invention of claim 7, where the refrigerant is dichlorodifluoromethane.

9. A method for refilling an apparatus for automobile air-conditioning that is designed for use with dichlorodifluoromethane refrigerant, the method comprising:
   (1) supplying the composition of claim 1 under pressure in an aerosol can fitted with an outlet compatible with a dichlorodifluoromethane recharging manifold of the apparatus; and
   (2) adding to said apparatus via the manifold the composition of claim 1.

10. A method for filling an apparatus for cooling the method comprising: (a) supplying the composition of claim 1 under pressure, in a container; and (b) adding to said apparatus the composition of claim 1 from said container.

11. The method of claim 10, wherein the apparatus for cooling is selected from the group consisting of air-conditioning and refrigeration apparatus.

12. Apparatus to be used for charging a refrigerating device with refrigerant, the apparatus comprising: (a) a container; and (b) the composition of claim 1.

13. The composition of claim 1, wherein the lubricating oil is selected from the group consisting of: synthetic alkyl aromatic lubricants alone or mixed with mineral oil, polyol ester or both; and polyol esters.

14. The composition of claim 1, wherein the tetrafluoroethane is 1,1,1,2-tetrofluoroethane and the chlorodifluoroethane is 1-chloro-1, 1-difluoroethane.

* * * * *

UNITED STATES PATENT AND TRADEMARK OFFICE
CERTIFICATE OF CORRECTION

PATENT NO. : 7,332,102 B2 Page 1 of 1
APPLICATION NO. : 11/176004
DATED : February 19, 2008
INVENTOR(S) : Ponder et al.

It is certified that error appears in the above-identified patent and that said Letters Patent is hereby corrected as shown below:

Under Section (73) on the Title page of the patent, the second inventor's name should be --Steffen Thomas, Jr.--

Signed and Sealed this

Tenth Day of June, 2008

JON W. DUDAS
*Director of the United States Patent and Trademark Office*